United States Patent
Heitz et al.

(10) Patent No.: US 11,787,892 B2
(45) Date of Patent: Oct. 17, 2023

(54) PROCESS FOR MAKING AN OXYMETHYLENE POLYMER

(71) Applicants: BASF SE, Ludwigshafen am Rhein (DE); Kolon Plastics Inc., Gwacheon-Si (KR)

(72) Inventors: Thomas Heitz, Ludwigshafen am Rhein (DE); Minlu Zhang, Ludwigshafen am Rhein (DE); Achim Stammer, Ludwigshafen am Rhein (DE); JongMoon Kim, Gimcheon (KR); In-Gi Cho, Gimcheon (KR); Jin-Sang Choi, Gimcheon (KR)

(73) Assignees: BASF SE; Kolon Plastics Inc.

( * ) Notice: Subject to any disclaimer, the term of this patent is extended or adjusted under 35 U.S.C. 154(b) by 1097 days.

(21) Appl. No.: 16/478,703

(22) PCT Filed: Jan. 9, 2018

(86) PCT No.: PCT/EP2018/050395
§ 371 (c)(1),
(2) Date: Jul. 17, 2019

(87) PCT Pub. No.: WO2018/134075
PCT Pub. Date: Jul. 26, 2018

(65) Prior Publication Data
US 2020/0048395 A1    Feb. 13, 2020

(30) Foreign Application Priority Data
Jan. 19, 2017 (EP) .................................... 17152101

(51) Int. Cl.
*C08G 2/10* (2006.01)
*B01J 27/12* (2006.01)
*C08G 2/06* (2006.01)

(52) U.S. Cl.
CPC ................ *C08G 2/10* (2013.01); *B01J 27/12* (2013.01); *C08G 2/06* (2013.01)

(58) Field of Classification Search
CPC ... C08G 2/10; C08G 2/06; C08L 59/00; B01J 27/12
See application file for complete search history.

(56) References Cited

U.S. PATENT DOCUMENTS

| | | | |
|---|---|---|---|
| 325,938 | A | 9/1885 | Kellogg |
| 6,388,049 | B1 | 5/2002 | Yokoyama et al. |
| 9,975,994 | B2 | 5/2018 | Gramlich et al. |
| 2018/0009950 | A1 | 1/2018 | Gramlich et al. |
| 2019/0085134 | A1 | 3/2019 | Gramlich et al. |

FOREIGN PATENT DOCUMENTS

| | | |
|---|---|---|
| DE | 10082068 B4 | 5/2006 |
| JP | H10182772 A | 7/1998 |
| JP | 2000178328 A | 6/2000 |
| JP | 2000-191738 A | 7/2000 |
| JP | 2014-105279 A | 6/2014 |
| JP | 2015110714 A | 6/2015 |
| JP | 2016089069 A | 5/2016 |
| WO | 2014/083983 A1 | 6/2014 |
| WO | WO-2016193243 A1 | 12/2016 |

OTHER PUBLICATIONS

U.S. Appl. No. 15/999,520, filed Aug. 17, 2018.
U.S. Appl. No. 16/062,752, filed Jun. 15, 2018.
Bednarek, M., et al., "Heteropolyacids—New Efficient Initiators of Cationic Polymerization", Macromolecular Chemistry and Physics, vol. 190, Issue 5, May 1989, pp. 929-938.
European Search Report for EP Application No. 17152101.6, dated Jun. 28, 2017, 3 pages.
International Preliminary Report on Patentability for PCT/EP2018/050395 dated May 14, 2019.
International Search Report for PCT/EP2018/050395 dated Apr. 11, 2018.
Written Opinion of the International Searching Authority for PCT/EP2018/050395 dated Apr. 11, 2018.

*Primary Examiner* — Jafar F Parsa
(74) *Attorney, Agent, or Firm* — Faegre Drinker Biddle & Reath LLP

(57) ABSTRACT

A process for making an oxymethylene polymer comprising polymerizing at least one compound capable of forming —$CH_2O$— repeat units (monomer) in the presence of at least one ester of the general formula I (ester): $R^1$—CO—O—$R^2$ (I) wherein $R^1$ can be hydrogen, wherein $R^1$ and $R^2$ are independently of each other linear or branched $C_1$ to $C_{10}$ alkyl $C_5$ to $C_7$ cycloalkyl —$[R^3\text{-}0\text{-}]_n R^4$ wherein $R^3$ is a linear or branched $C_2$ to $C_5$ alkylen and $R^4$ is a linear of branched $C_1$ to $C_5$ alkyl and n is an integer of from 1 to 5. and in the presence of at least one Lewis acid.

9 Claims, No Drawings

PROCESS FOR MAKING AN OXYMETHYLENE POLYMER

CROSS-REFERENCE TO RELATED APPLICATIONS

This application is a national stage application (under 35 U.S.C. § 371) of PCT/EP2018/050395, filed Jan.9, 2018, which claims benefit of European Application No. 17152101.6, filed Jan. 19, 2017, both of which are incorporated herein by reference in their entirety.

The present invention relates to a process for making an oxymethylene polymer, which comprises polymerizing one or more oxymethylene forming compounds in the presence of one or more esters and Lewis acids.

Oxymethylene polymer is a collective term for homo- or copolymers with a polymer backbone, which to a certain extend is build up of from oxymethylene moieties. Oxymethylene polymers can be molded into diverse appliances for industrial or consumer purposes.

Oxymethylene polymers can be obtained via anionic polymerization of formaldehyde or cationic polymerization of its cyclic oligomers and possibly comonomers preferably in the presence of a compound initiating respectively catalyzing the polymerization reaction.

JP 2015110714 A2 discloses a process for the manufacture of oxymethylene polymers wherein the polymerization is carried out in the presence of a stabilizer. The compounds disclosed as stabilizers are sterically hindered compounds, for instance pentaethyrol tetrakis(3-(3,5-di-tert butyl 4-hydroxylphenyl proprionate).

From DE 100 82 068 a polymerization process is known which employs esters of inorganic acids, in particular esters of perchloric acid with aliphatic alcohols.

Orthoesters of aliphatic, aromatic or heterocyclic acids, in particular the orthoesters of formic acid are disclosed as molecular weight regulator for the polymerization to give oxymethylene polymers e.g. in U.S. Pat. No. 325,938.

JP 10182772 A2 discloses the (co)polymerization of trioxane using a rare earth metal salt of perfluroalkylsulfonic acids as polymerization catalyst. Further, it is disclosed that the catalyst is preferably diluted with an inert solvent. Among others, butyl acetate ester is mentioned as being a suitable inert solvent.

One object of the present disclosure is a process for the manufacture of an oxymethylene polymer with high conversion or good yields respectively. The present disclosure also relates to a process for the manufacture of an oxymethylene polymer in which the Lewis acid which may act as a catalyst for the polymerization is well activated so that the reaction proceeds in facile manner.

Another object of the present disclosure is a process for the manufacture of an oxymethylene polymer with high conversion in which the use of aromatic hydrocarbon solvents can be dispensed with.

Yet another object is an oxymethylene polymer with stable endgroups.

In general, disclosed herein is a process for the preparation of an oxymethylene polymer which comprises polymerizing at least one compound capable of forming —CH2O— repeat units in the presence of at least one ester of the general formula I

R1-CO—O—R2     (I)

wherein
R1 can be hydrogen and
wherein R1 and R2 are independently of each other
linear or branched C1 to C10 alkyl
C5 to C7 cycloalkyl or
—[R3-O-]nR4
wherein
R3 is a linear or branched C2 to C5 alkylen and
R4 is a linear of branched C1 to C5 alkyl and
n is an integer of from 1 to 5.
and in the presence of at least one Lewis acid. A compound capable of forming repeat units is in the following also abbreviated as monomer.

In addition, disclosed herein is an oxymethylene polymer comprising that one of its endgroups is an endgroup of general formula (II)

R1-CO—     (II)

wherein R1 is
hydrogen
linear or branched C1 to C10 alkyl
C5 to C7 cycloalkyl or
—[R3-O-]nR4
wherein
R3 is a linear or branched C2 to C5 alkylen and
R4 is a linear of branched C1 to C5 alkyl and
n is an integer of from 1 to 5.
and at least one endgroup of general formula (III)

—O—R2     (III)

wherein R2 is
linear or branched C1 to C10 alkyl
C5 to C7 cycloalkyl or
—[R3-O-]nR4
wherein
R3 is a linear or branched C2 to C5 alkylen and
R4 is a linear of branched C1 to C5 alkyl and
n is an integer of from 1 to 5.

Disclosed herein is also the use of the oxymethylene polymer obtained by the process or the oxymethylene polymer comprising one endgroup of general formula (II) respectively for the manufacture of a film, fiber or shaped article. Moreover, disclosed herein is a fiber, film or shaped article produced comprising said oxymethylene polymer.

In the following "at least one" may in general mean one or two or more, for instance one or a mixture of two or more such as three or four or five or more, wherein more may mean a plurality or an uncountable. If used in connection with chemical compounds "at least one" is meant in the sense that one or two or more chemical compounds differing in their chemical constitution, that is chemical nature, are described.

In the following "polymer" may mean homopolymer or copolymer or a mixture thereof. The person skilled in the art appreciates that any polymer, may it be a homopolymer or a copolymer by nature typically is a mixture of polymeric individuals differing in their constitution such as chain length, degree of branching or nature of endgroups.

The oxymethylene polymer (in the following abbreviated as POM) made by the process disclosed herein is not particularly limited. Generally, POM may be characterized as a polymer preferably comprising at least 50 mol-% of —CH2O— repeat units. POM may be unbranched and linear or POM may be branched.

POM may be a homopolymer, meaning a polymer having only —CH2O— repeat units. POM may also be a copolymer.

POM may also be a mixture of a homopolymer and a copolymer.

It may be preferred that POM is a copolymer. In addition to the —CH2O— repeat units the copolymer comprises at least one other repeat unit.

The copolymer, alongside the —CH2O— repeat unit, may comprise preferably up to 50 mol %, such as up to 40 mol %, more preferably up to 30 mol %, more preferably up to 20 mol %, more preferably of from 0.01 to 20 mol %, more preferably of from 0.1 to 10 mol %, more preferably of from 0.2 to 5 mol %, and it may particularly preferably that it may comprise of from 0.5 to 3 mol %, at least one further repeat unit, in particular of the general formula (IV)

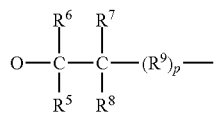

(IV)

where the radicals R5, R6, R7, and R8 may be identical or different from one another and, independently of one another, may be H, or C1 to C4 alkyl, such as a methyl, ethyl, propyl, e.g. n-propyl or isopropyl, or butyl, e.g. n-butyl, isobutyl, or tert-butyl, and where R9 may be —CR10 2- and/or a —CR11 2O—, where R10 and R11 may be identical or different from one another and, independently of one another, may be H, or C1 to C4 alkyl, thus, R9 may be methylene, oyxmethylene, C1 to C4 alkyl-substituted methylene, and/or C1 to C4 alkyl-substituted oxymethylene, where the C1 to C4 alkyl present, if appropriate, as substituent on the methylene group and/or on the oxymethylene group may, by way of example, be methyl, ethyl, propyl, e.g. n-propyl or isopropyl, or butyl, e.g. n-butyl, isobutyl, or tert-butyl, and where p may be an integer of from 0 to 3, e.g. 0 or 1 or 2 or 3.

It may be preferred that the copolymer comprises alongside the —CH2O— repeat unit two repeat units of the general formula IV. It may be most preferred that it comprises alongside the —CH2O-repeat unit one repeat unit of the general formula IV.

Generally, the use of repeat units in addition to the —CH2O— repeat units, in particular those of the general formula (IV) leads to POM which has a lower tendency to depolymerize. Use of very little amount of such repeat units, for instance less than 0.01 mol-% gives POM which has a depolymerization behavior of POM homopolymer. It may therefore be preferred to use said units in higher amounts such as at least 0.1 mol-%, at least 0.2 mol-% or at least 0.5 mol %. The use of said other repeat units in high or very high amounts may decrease the crystallinity and the tensile strength of POM compared to POM homopolymer. This may not be desirable for certain applications of POM. It may therefore be preferred to use said repeat units in amounts of up to 50 mol-% such as up to 40, 30, 20 or 10 mol-%. Using up to 5 or up to 3 mol-% may be most preferably in this respect.

POM has two endgroups if it is linear or more than two endgroups if it is branched. A typical branching agent is a diepoxide or a diacetale, resulting in a structure having an even number of arms.

It may be preferred that one of the endgroups is an endgroup of general formula (II)

R1-CO— (II)

wherein R1 is hydrogen linear or branched C1 to C10 alkyl

C5 to C7 cycloalkyl or

—[R3-O-]nR4 wherein

R3 is a linear or branched C2 to C5 alkylen and

R4 is a linear of branched C1 to C5 alkyl and n is an integer of from 1 to 5.

Thereby:

linear or branched C1 to C10 alkyl in general may mean any linear or branched alkyl group in the range of from 1 to 10 carbon atoms, whereby linear or branched C1 to C5 alkyl may be more preferred, whereby linear or branched C1 to C4 alkyl may be most preferred; thus C1 to C10 alkyl may mean methyl, ethyl, n-propyl, iso-propyl, n-butyl, iso-butyl, tert-butyl, n-pentyl, iso-pentyl, n-hexyl, n-heptyl, n-octyl, n-nonyl, n-decyl, whereby the iso and the linear species may be preferred and whereby the linear species may be most preferred;

linear or branched C1 to C5 alkyl in general may mean any linear or branched alkyl group in the range of from 1 to 5 carbon atoms, whereby C1 to C4 may be more preferred; thus linear or branched C1 to C5 alkyl may mean methyl, ethyl, n-propyl, iso-propyl, n-butyl, iso-butyl, tertbutyl, n-pentyl, iso-pentyl, whereby the iso or linear species may be preferred, whereby the linear species may be most preferred;

linear of branched C1 to C4 alkyl may in general mean any linear or branched C1 to C4 alkyl group in the range of from 1 to 4 carbon atoms, such as a linear or branched C1 to C3 alkyl; thus C1 to C4 alkyl may mean such as methyl, ethyl, n-propyl, iso-propyl, n-butyl, iso-butyl, tertbutyl, whereby the iso or linear species may be preferred, whereby the linear species may be most preferred;

linear or branched C1 to C3 alkyl may in general mean any linear or branched C1 to C3 alkyl group in the range of from 1 to 3 carbon atoms, such as methyl, ethyl, n-propyl, iso-propyl, n-butyl, iso-butyl, tert-butyl, whereby the iso or linear species may be preferred, whereby the linear species may be most preferred C5 to C7 cycloalkyl in general may mean any cycloaliphatic group in the range of from 5 to 7 carbon atoms, thus it may mean cyclopentyl, cyclohexyl or cycloheptyl, whereby cyclohexyl may be preferred;

linear or branched C1 to C5 alkylene in general may mean any C1 to C5 alkylene group in the range of from 1 to 5 carbon atoms, thus it may mean methylene, ethylene, n-propylene, 2-methyl propylene, n-butylene or n-pentylene, whereby the iso or linear species may be preferred, whereby the linear species may be most preferred, whereby it may be specifically preferred that it is methylene, ethylene or n-propylene.

In particular, R1 may be a linear or branched C1 to C10 alkyl, most preferred a linear or branched C1 to C3 alkyl. It may be particularly preferred that R1 is methyl, ethyl or n-propyl.

In addition to the one endgroup of general formula (II) the POM comprises at least one, in case it is linear one, endgroup of general formula (III).

—O—R2 (III)

wherein R2 is
linear or branched C1 to C10 alkyl
C5 to C7 cycloalkyl or
—[R3-O-]nR4
wherein
R3 is a linear or branched C2 to C5 alkylen and
R4 is a linear of branched C1 to C5 alkyl and
n is an integer of from 1 to 5.

Thereby linear or branched C1 to C10 alkyl, C5 to C7 cycloalky, linear or branched C1 to C5 alkylene and linear of branched C1 to C5 alkyl are defined as given above for general formula (II).

n may be 1 or 2 or 3 or 3 or 4 or 5, preferably n may be 1 or 2 or 3.

In particular, R2 may be a linear or branched C1 to C10 alkyl, most preferred a linear or branched C1 to C4 alkyl. It may be particularly preferred that R2 is methyl, ethyl, n-propyl or n-butyl.

POM comprising an endgroup of general formula (I) in which R1 is methyl, ethyl or n-propyl and at least one endgroup of general formula (II) in which R2 is methyl, ethyl, n-propyl or n-butyl may be preferred for applications that require very little or no detectable odor.

The melting point of POM may preferably be in the range of from 150 to 200° C. If POM is a homopolymer, the melting point then typically can be in the range of from 170 to 190° C. If POM is a copolymer, the melting point may more preferably be in the range of from 160 to 180° C. These melting points are determined with a heating and cooling rate of 20 K/Min according to DIN EN ISO 11357-3 (year 2013-04) and a sample weight of about 8.5 mg.

The molar mass (weight-average Mw; determined by way of the method described below in "Examples—Molar mass determination") of POM can be adjusted within a wide range. It may preferably be in the range of from 10 000 to 240 000 g/mol±10%, while the number-average molecular weight Mn may preferably be in the range of from 8 000 to 85 000. If POM is a homopolymer it may be a further preference that the weight average Mw may range of from 11 000 to 240 000 g/mol±10%, for instance from 25 000 to 240 000 g/mol±10% while the molecular weight Mn may range of from 9 000 to 85 000 g/mol. If POM is a copolymer it may be a further preference that the molar mass (Mw) may range of from 80 000 to 220 000 g/mol±10%, while its molecular weight Mn may range of from 9 000 to 38 000 g/mol. The Mw/Mn ratio (Polydispersity Index) of POM may preferably be in the range of from 1.4 to 14. If POM is a homopolymer a further preference may be that the Mw/Mn ratio may range of from 1.4 to 6.9. If POM is a copolymer a further preference may be that the Mw/Mn may range of from 2.1 to 14.

The molecular weight distribution of POM may be monomodal or essentially monomodal. It may also have a multimodal molecular weight distribution. It may be possible that POM has a bimodal molecular weight distribution.

The process disclosed comprises polymerizing at least one compound capable of forming —CH2O— repeat units. Said compound is in following also abbreviated as monomer. It may be preferred that two monomers, are polymerized. It may also be preferred that only one monomer is polymerized. In case a POM homopolymer is desired only one monomer is polymerized.

In case a POM copolymer is desired in addition to the at least one monomer at least one comonomer is polymerized. A comonomer preferably is a compound capable of forming repeat units of general formula IV. Thereby it may be preferred that two comonomers are additionally polymerized. It may be also preferred that only one comonomer is additionally polymerized. In particular it may be most preferred that one monomer and one or two comonomers are polymerized. A POM copolymer resulting from the reaction of one monomer and two comonomers is also termed POM terpolymer.

It is possible that the at least one, preferably two, most preferably one monomer is polymerized together with the at least one, preferably one or two comonomers. This leads to a random or essentially random POM copolymer. It may also be possible that all or a portion of the at least one, preferably two, most preferably one monomer and all or a portion of the at least one, preferably one or two comonomers are polymerized subsequently. This leads to a block or segmented type POM copolymer.

The at least one monomer may be at least one cyclic oligomer of formaldehyde, preferably 1,3,5-trioxane (trioxane) or 1,3,5,7-tetroxane. It may be most preferred that the monomer is trioxane.

The at least one comonomer may be at least one cyclic ether or cyclic formal. It may be preferred that the cyclic ether is one of the general formula (V)

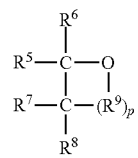

(V)

where the radicals R5 to R9 and the index p are as defined above for formula IV. It may be preferred that p is 0 or 1 or 2 and that R9 is CH2.

Examples of a cyclic ether and cyclic formal are ethylene oxide, propylene 1,2-oxide, butylene 1,2-oxide, butylene 1,3-oxide, 1,3-dioxane, 1,3-dioxolane, and 1,3-dioxepan, and also linear oligo- or polyformal, e.g. polydioxolane or polydioxepan. It may be preferred that the at least one, preferably one or two comonomers has of from 2 to 4 carbon atoms, most preferably 2 or 4 carbon atoms. Most preferable, the comonomers may be 1,3-dioxolane or 1,3-dioxepane.

The at least one comonomer may be of such structure that it may function as branching agent. The at least one comonomer of this type may be of general formula (VI) or (VII)

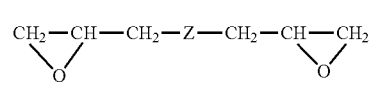

(VI)

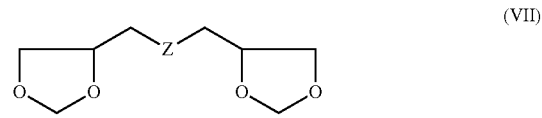

(VII)

where Z is a chemical bond, or —(OR12)nO—, with n from 0 to 5. In this context, R12 may be an alkylene group, which may preferably have from 1 to 8 carbon atoms, for example methylene, ethylene, propylene, butylene, pentylene, hexylene, heptylene, or octylene and, if appropriate, having suitable substitution, or R12 may be is a cycloalkylene group, which may preferably have from 3 to 8 carbon atoms for example a cyclopropylene, cyclobutylene, cyclopentylene, cyclohexylene, cycloheptylene, or cyclooctylene and, if appropriate, having suitable substitution.

Examples of a comonomer of this type which may be preferred are ethylene diglycide, diglycidyl ether, and an ether composed of glycidyl moieties and formaldehyde, 1,3-dioxane or trioxane in a molar ratio of 2:1, and also diethers composed of 2 mol of glycidyl compound and 1 mol of an aliphatic diol having 2, 3, 4, 5, 6, 7, or 8 carbon atoms, e.g. diglycidyl ethers of ethylene glycol, 1,4-butanediol, 1,3-butanediol, cyclobutane-1,3-diol, 1,2-propanediol, and 1,4-cyclohexanediol.

Examples of the at least one comonomer of this type which may be employed is an alcohol whose functionality is three or higher, or a derivative thereof, preferably a tri- to hexahydric alcohol or their derivatives. A derivative that may be preferred is a compound in which, respectively, two OH groups have been reacted with formaldehyde. Other examples include a monofunctional and/or a polyfunctional glycidyl compound, such a glycidyl ether.

The amount in which the at least one comonomer of this type may be used in the process disclosed herein is not specifically limited. Generally, it may depend on the degree of branching which is appropriate for the intended application of the POM. Typically, the amount of the at least one branching agent is low or relatively low. For example, of from 0.01 wt.-% 2 wt.-% based on the at least one monomer or the mixture of the at least one monomer and any other at least one comonomer can be employed. It may be preferred to use the at least one, preferably one branching agent in an amount ranging of from 1 to 0.05 wt.-% based on the at least one monomer or the mixture of the at least one monomer and any other at least one comonomer.

The process disclosed herein can be carried out in the presence of at least one chain transfer agent. The molecular weight of the POM homo- or copolymer can be adjusted by the use of at least one, preferably two, most preferably one chain transfer agent. The at least one chain transfer agent typically is a monomeric or oligomeric acetal of formaldehyde. It may be preferred to use at least one chain transfer agent CTA of the general formula IIX

R13-(OCH2)q-O—R14        (IIX)

in which R13 and R14, independently of one another, are monovalent organic radicals, preferably alkyl groups, such as C1 to C4 alkyl, such as butyl, e.g. n-butyl, iso-butyl or tert-butyl, propyl, e.g. n-propyl or iso-propyl, ethyl, or methyl, whereby methyl or n-butyl may be preferred and q is an integer of from 1 to 20, e. g. of from 1 to 10, most preferred from 1 to 5. A particularly preferred chain transfer agent may be a compound of the formula IIX, in which q=1, and it may be most preferably methylal or butylal.

The amount in which the at least one chain transfer agent may be used in the process disclosed is not specifically limited. Smaller amounts of chain transfer agent typically lead to higher molecular weight POM, while when the amount of chain transfer agent is too high it may lead to polymers with insufficiently high molecular weight. The amount used of the at least one chain transfer agent may usually less than 10 000 ppm, preferably less than 5000 ppm, most preferably less than 1000 ppm, based on the monomer or the mixture of monomer and comonomer respectively. In case it is employed it may for instance be used in amounts of 10 ppm or higher.

The process disclosed herein comprises that the polymerization is carried out in the presence of at least one ester of the general formula I

R1-CO—O—R2        (I)

wherein, R1 and R2 are as defined above under formulas II and III respectively.

One of the aspects which may be considered in the choice of the at least one ester of the general formula (I) is behavior during the workup of the POM. Under this aspect R1 which is a linear or branched C1 to C10 alkyl may be preferred, whereby linear or branched C1 to C5 alkyl may be more preferred, whereby linear or branched C1 to C4 alkyl, such as C1 to C3 alkyl may be most preferred; whereby the iso and the linear species may be preferred and whereby the linear species may be most preferred. Under this aspect it may further be preferred that R2 is a linear or branched C1 to C10 alkyl, most preferred a linear or branched C1 to C4 alkyl. It may be particularly preferred that R2 is methyl, ethyl, n-propyl or n-butyl. The at least one ester with shorter or short R1 and R2 may have the advantage that their residuals do not disturb the workup of the POM.

Consequently, it may be most preferred that the process disclosed herein comprises the esters listed in Table 1:

| R1—CO—O—R2 | |
| --- | --- |
| R1 | R2 |
| CH3 | CH3 |
| CH3—CH2 | CH3 |
| CH3—CH2—CH2 | CH3 |
| H | CH3—CH2 |
| CH3 | CH3—CH2 |
| CH3—CH2 | CH3—CH2 |
| CH3—CH2—CH2 | CH3—CH2 |
| H | CH3—CH2—CH2 |
| CH3 | CH3—CH2—CH2 |
| CH3—CH2 | CH3—CH2—CH2 |
| CH3—CH2—CH2 | CH3—CH2—CH2 |
| H | CH3—CH2—CH2—CH2 |
| CH3 | CH3—CH2—CH2—CH2 |
| CH3—CH2 | CH3—CH2—CH2—CH2 |
| CH3—CH2—CH2 | CH3—CH2—CH2—CH2 |

The amount in which the at least one ester may be used in the process disclosed herein is not specifically limited. Generally, it may be preferred to use the at least one ester in an amount that allows for comfortable handling. Typically the weight ratio of the at least one ester to the at least one Lewis acid ranges of from 10:1 to 300:1, such as of from 20:1 to 200:1. It may be preferred that said ratio is of from 30:1 to 150:1. It may be more preferred that said ratio is of from 50:1 to 100:1.

While in principle it may be possible to use the at least one ester neat and as such it may generally be preferred to use it in a mixture comprising the at least one Lewis acid.

The process disclosed herein further comprises that the polymerization is carried out in the presence of at least one Lewis acid. The Lewis acid generally functions as initiator or catalyst for the polymerization. Thereby it may be preferred that it is carried out in the presence of two, more preferred one Lewis acid.

The at least one Lewis acid may preferably be at least one, e.g. two, more preferred one halogenide of boron, tin, titanium, phosphorous, antimony or arsenic. Thereby it may be preferred that the halogenide is a chloride or fluoride or that the halogenide contains both. Examples thereof are boron trifluoride, tin tetrachloride, titanium tetrachloride, phosphorus pentafluoride, phosphorous pentachloride, antimony pentaflouride and arsenic pentafluoride, and especially also their complex compounds.

The at least one Lewis acid may preferably be at least one halogenide of boron, in particular boron trifluoride, e.g. boron trifluoro hydrate, or at least one, more preferred one coordination compound of boron halogenide and at least one, more preferred one organic compound comprising at least one oxygen or sulfur atom or both. Thereby it may be more preferred that the organic compound comprises only at least one, in particular one oxygen atom. Said organic compound to form a coordination compound of boron halogenide may for instance be an alcohol, ether or sulfide. Among the at least one coordination compounds of boron halogenide the coordination compound with an ether, in particular an alkyl ether, such as a C1 to C4 alkyl ether may be most preferred. The coordination compound of boron trifluoride with an ether, in particular an alkyl ether, such as a C1 to C4 alkyl ether may be most preferred, in particular inter alia, boron trifluoride dibutyl etherate, boron trifluoride diethyl etherate or boron trifluoride dimethyl etherate or a mixture thereof. Boron trifluoride diethyletherate may most preferably be used.

The amount in which the at least one Lewis acid may be used in the process disclosed herein is not specifically limited. Typically, the amount of the at least one Lewis acid may be of from 10 to 150 ppm, such as 20 to 140 ppm, in either case based on the weight of the at least one monomer. It may be preferred to use the at least one Lewis acid in an amount of from 30 to 130 ppm, based on the weight of at least one monomer. In particular it may be advantageous to use the at least one Lewis acid in an amount of from 40 to 100 ppm, based on the weight of the at least one monomer. Lower amounts may lead to slower reaction initiation and higher amounts usually do not lead to a faster reaction and possibly incur high efforts in separating the Lewis acid from the polymer in the end.

Generally, the process disclosed herein can be carried out using diverse methods. Such methods are, either known to the person skilled in the art or are accessible to him by application of his general knowledge. It may be preferred that POM is produced via cationic polymerization. During cationic polymerization, POM can be formed in bulk (i.e. without or essentially without solvent).

Generally, it may be advantageous that the at least one Lewis acid is mixed with the at least one ester. Thereby it may be preferred that the at least one Lewis acid is dissolved in the at least one ester. Typically, the at least one Lewis acid is premixed with the at least one ester (premixture). This also allows to add small amounts of Lewis acid in a defined manner to the monomer or comonomer or mixtures thereof.

The at least one Lewis acid may be dissolved in at least one ester and in addition in at least one, preferably one cosolvent. The at least one cosolvent may be an aliphatic hydrocarbon, such as n-hexane, cyclohexane or n-heptane. An aromatic hydrocarbon such as benzene or toluene is not a cosolvent for the process disclosed herein. It may be particularly preferred to dissolve the Lewis acid in only the at least one, most preferred one ester without the use of a cosolvent.

It may be most preferred that the premixture is added to the at least one monomer. It may be particularly preferred that the premixture is added to the at least one monomer, whereby the monomer is liquid.

It may also be possible and preferred to add the premixture to a mixture of the at least one monomer with the at least one comonomer. Thereby it may be more preferred that both—the at least one monomer and the at least one comonomer—are liquid, when the premixture is added. It may also be preferred that the premixture is first added to the at least one comonomer and that thereafter the mixture of the premixture and the at least one comonomer is added to the at least one monomer. Thereby it may be more preferred that the at least one comonomer is liquid, when the premixture is added. It may be particularly preferred that the at least one monomer is liquid, when the mixture of premixture with the at least one comonomer is added to the at least one monomer.

The process disclosed herein, may be carried out at temperatures, pressures and in equipment generally known to the person skilled in the art or accessible to him by application of his general knowledge. For instance, it may be performed in an extruder or a cascade of two or more extruders such as of twin-screw type and self-cleaning type. It may also be possible to carry out the process disclosed herein in a kneader or a cascade of two or more kneaders, such as of the self-cleaning type. Generally, it may be advantageous to carry out the polymerization at temperatures as low as possible in order to avoid waste of energy and at temperatures high enough to sustain the polymerization and to ensure good blending, in particular by way of sustaining the at least one monomer and if present also the at least one comonomer in the liquid state. Thus, it may be preferred to carry out the polymerization at a temperature of from 50 to 150° C., whereby temperatures of from 60 to 120° C. may be more preferred. Thereby the temperatures refer to the temperature in the bulk.

In general, it may be advantageous to deactivate the Lewis acid when the polymerization reaction is finished.

Thereby it may be preferred to add at least one deactivating agent. It may be more preferred to add two or most preferred to add one deactivating agent. The at least one deactiving agent may for instance be ammonia, an aliphatic amine, such as triethylamine, tri-n-butylamine, triethanolamine, a quaternary ammonium salt such as tetrabutyl ammonium hydroxide, a hydroxide, an inorganic weak acid salt, or organic acid salt of an alkali metal or alkaline earth metal.

The at least one deactivating agent may be added neat or be added as a solution in an organic solvent. The latter may be more effective in terms of stopping the polymerization reaction and therefore preferred. The organic solvent used in this case, may be an aliphatic hydrocarbon, such as n-hexane, cyclohexane or n-heptane or an alcohol such as methanol or ethanol or a ketone such as acetone or methyl ethyl ketone or an ester.

The amount of the at least one deactivating agent, generally depends on the equivalents of active sites in the deactivating agent and the equivalents in the at least one Lewis acid to be deactivated; thus, for instance the equivalents of nitrogen and boron atoms. The at least one deactivating agent may be used advantageously in a molar excess to the at least one Lewis acid, such as from 50:1 to at least 2:1.

The process according to the invention may further comprise additional measures such as heat or solvent treatment, the addition of at least one processing aid or stabilizer or a combination of such measures. The amount of such additives is generally chosen a minimum to effectively stabilize or process POM without affecting the properties such as thermal or mechanical properties. Such measures are either generally known by the person skilled in the art or are accessible to him by applying his general knowledge. The heat treatment may be carried out by temperatures at the higher end or above the polymerization temperature for instance at temperatures of from 80 to 270° C., whereby temperatures of from 180 to 240° C. may be preferred.

It may be preferred to add at least one antioxidant. By way of example this may be a sterically hindered phenol, such as triethylene glycol bis(3-tert-butyl-4-hydroxy-5-methylphenyl)propionate.

It may be used in amount of from 0.001 to 10% by weight, e.g. of from 0.002 to 5% by weight, more preferred it may be of from 0.005 to 3% by weight based on the POM.

It may further be preferred to add at least one formaldehyde stabilizer. By way of example this may be a condensate of melamine and formaldehyde.

It may be used in amount of from 0.001 to 10% by weight, e.g. of from 0.002 to 5% by weight, more preferred it may be of from 0.005 to 3% by weight based on the POM.

It may further be preferred to us use at least one UV absorbant. By way of example this may be a hindered amine light stabilizer.

A special example may be a hindered amine of the polymeric structure, as for example:

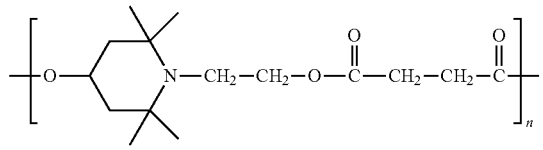

A hindered amine may be used in amount of from 0.001 to 10% by weight, e.g. of from 0.002 to 5% by weight, more preferred it may be of from 0.005 to 2% by weight based on the POM.

The process disclosed may in addition comprise the addition at least one particulate or fibrous filler or reinforcing agent. By way of examples these may be calcium carbonate, barium sulfate, clay, titanium oxide, silicon oxide, mica powder fillers such as glass beads, glass fibers, carbon fibers, ceramic fibers or aramid fibers or a mixture of two or more thereof.

The process disclosed herein typically yields POM in in efficient manner and in high yields. The POM obtained has a good stability. POM having a good thermal stability shows little or very little weight loss upon thermal treatment. The POM can be formed, for instance pelletized. POM, in particular in its further processed form, for the manufacture of a fiber, film or shaped article. The film, fiber or shaped article generally have a widespread applicability. They for instance may be used in industry, the mobility sector such as automotive or household. In particular, they may have applicability in the food contact field.

Another particular aspect of the present disclosure is a process for the manufacture of an oxymethylene polymer of good thermal stability and good mechanical properties with high conversion in which the use of aromatic hydrocarbon solvents can be avoided.

Another especially particular aspect of the present disclosure is a process for the manufacture of an oxymethylene polymer of good thermal stability and good mechanical properties with high conversion free of traces of aromatic solvents for the use in food contact applications.

EXAMPLES

Molar Mass Determination

The molar masses of the polymers were determined via size-exclusion chromatography in a SEC apparatus. This SEC apparatus was composed of the following combination of separating columns: a preliminary column of length 5 cm and diameter 7.5 mm, a second linear column of length 30 cm and diameter 7.5 mm. The separating material in both columns was PL-HFIP gel from Polymer Laboratories. The detector used comprised a differential refractometer from Agilent G1362 A. A mixture composed of hexafluoro isopropanol with 0.05% of potassium trifluoro acetate was used as eluent. The flow rate was 0.5 ml/min, the column temperature being 40° C. 60 microliters of a solution at a concentration of 1.5 g of specimen per liter of eluent were injected. This specimen solution had been filtered in advance through Millipor Millex GF (pore width 0.2 micrometers). Narrowly distributed PMMA standards from PSS (Mainz, DE) with molar masses M from 505 to 2.740.000 g/mol were used for calibration.

Polydispersity Index

Polydispersity index is defined as the weight average molecular weight divided by the number average molecular weight.

Weight Loss Determination

The thermal stability of the purified polymers was determined by heating a polymer sample under a constant flow of 15 l/h of nitrogen at 222° C. for two hours. The polymer sample was weighed prior to the heat treatment and after a cooling time of 20 minutes.

Process for the Manufacture of Homopolymer:

Examples 1 to 12 and Comparative Examples C1 to C3

A batch-wise, bulk polymerization of 100 g of the monomer 1,3,5-trioxane was carried out in air at 80° C.

The reaction was initiated using 80 ppm a BF3*alkylether coordination compound (Lewis acid) dissolved an ester (premixture) as specified in Table 1. The premixture was dosed to the monomer.

The polymer obtained was ground and extracted using a refluxing methanol/water/sodium carbonate (10 weight % solution in water) (23:44:1) mixture. After cooling the polymer was filtered and rinsed further with a 5 weight % sodium carbonate solution. The weight of the polymeric materials obtained after these two purification steps in relation to the mass of monomer used in the reaction is defined as the Yield given in Table 1.

TABLE 1

| Example and Comparative Example | Lewis acid | Ester | Ratio Eter/Lewis acid | Yield | Weight average molecular weight MW (kg/mol) | Polydispersity index |
| --- | --- | --- | --- | --- | --- | --- |
| 1 | BF3*OMe2 | Ethyl acetate | 50:1 | 87 | | |
| 2 | BF3*OMe2 | Propyl acetate | 50:1 | 86 | | |
| 3 | BF3*OMe2 | Propyl propionate | 50:1 | 85 | | |
| C1 | BF3*OMe2 | Benzene | 50:1 | 51 | | |
| 4 | BF3*OMe2 | Ethyl acetate | 100:1 | 89 | 176 | 9 |
| 5 | BF3*OMe2 | Propyl acetate | 100:1 | 89 | 194 | 11 |

TABLE 1-continued

| Example and Comparative Example | Lewis acid | Ester | Ratio Eter/Lewis acid | Yield | Weight average molecular weight MW (kg/mol) | Polydispersity index |
|---|---|---|---|---|---|---|
| 6 | BF3*OMe2 | Propyl propionate | 100:1 | 90 | 153 | 8 |
| C2 | BF3*OMe2 | Benzene | 100:1 | 79 | 191 | 12 |
| 7 | BF3*OEt2 | Ethyl acetate | 200:1 | 92 | | |
| 8 | BF3*OEt2 | Propyl acetate | 200:1 | 88 | | |
| 9 | BF3*OEt2 | n-Butyl acetate | 200:1 | 90 | | |
| 10 | BF3*OEt2 | Methyl propionate | 200:1 | 92 | | |
| 11 | BF3*OEt2 | Ethyl propionate | 200:1 | 81 | | |
| 12 | BF3*OEt2 | Propyl propionate | 200:1 | 90 | | |
| C3 | BF3*OEt2 | Methyl formate | 200:1 | 80 | | |

Examples 13 and 14

The process was carried out as specified above with the exception that instead of 80 ppm of Lewis acid 50 ppm of Lewis acid were used. See Table 2 for the respective summary.

TABLE 2

| Example and Comparative Example | Lewis acid | Ester | Ratio Ester/Lewis acid | Yield |
|---|---|---|---|---|
| 13 | BF3*OMe2 | Ethyl acetate | 300:1 | 93 |
| 14 | BF3*OMe2 | Propyl acetate | 300:1 | 92 |

Process for the Manufacture of Copolymer:

Examples 15 to 18 and Comparative Examples C4

A batch-wise, bulk polymerization of 96 g of the monomer 1,3,5-trioxane and 4 g of the comonomer 1,3-dioxolane was carried out in air at 80° C. The reaction was initiated using 80 ppm a BF3*OEt2 (Lewis acid).

The Lewis acid was first dissolved an ester as specified in Table 3. This premixture was further mixed with the comonomer and then dosed into the monomer.

The purification was carried out as described above for the homopolymers.

Examples 19 to 21 and Comparative Example C5

The process was carried out as described above with the exception that the premixture was dosed to the mixture of monomer and comonomer.

TABLE 3

| Example and Comparative Example | Lewis acid | Ester | Ratio Ester/Lewis acid | Yield | Weight loss upon thermal treatment in N2 (wt %) | Weight average molecular weight (kg/mol) | Polydispersity index |
|---|---|---|---|---|---|---|---|
| 15 | BF3*OEt2 | Ethyl acetate | 50:1 | 97.5 | 8.9 | 100 | 4.8 |
| 16 | BF3*OEt2 | Propyl acetate | 50:1 | 97.3 | 12.6 | 122 | 6.0 |
| 17 | BF3*OEt2 | n-Butyl acetate | 50:1 | 95.7 | 13.9 | 129 | 7.2 |
| 18 | BF3*OEt2 | Methyl formate | 50:1 | 95.3 | 7.0 | 144 | 7.2 |
| C4 | BF3*OEt2 | Benzene | 50:1 | 96.7 | 8.6 | 151 | 7.0 |
| 19 | BF3*OEt2 | Ethyl acetate | 100:1 | 97.8 | 8.6 | 130 | 6.6 |
| 20 | BF3*OEt2 | Propyl acetate | 100:1 | 97.5 | 8.7 | 117 | 5.7 |
| 21 | BF3*OEt2 | n-Butyl acetate | 100:1 | 97.6 | 13.6 | 116 | 5.7 |
| C5 | BF3*OEt2 | Benzene | 100:1 | 97.8 | 8.3 | 120 | 5.2 |

The invention claimed is:

1. A process for making an oxymethylene polymer comprising polymerizing at least one compound capable of forming —CH$_2$O— repeat units (monomer) and at least one comonomer which is a cyclic ether or cyclic formal in the presence of at least one ester of the formula I (ester)

wherein
R$^1$ can be hydrogen, with the proviso that R$^2$ is C$_2$ alkyl or linear C$_3$ to C$_4$ alkyl,
wherein R$^1$ and R$^2$ are independently of each other linear or branched C$_1$ to C$_4$ alkyl
and in the presence of at least one Lewis acid, wherein the Lewis acid is an halogenide of boron, tin, titanium, phosphorus, antimony or arsenic, wherein the at least one Lewis acid is premixed with the at least one ester (premixture) and the weight ratio of the at least one ester to the at least one Lewis acid being of from 10:1 to 300:1.

2. The process according to claim 1, wherein the monomer is at least one cyclic oligomer of formaldehyde.

3. The process according to claim 1, wherein the premixture is added to the at least one monomer, the latter being liquid.

4. The process according to claim 3, wherein the premixture is first added to the at least one comonomer, the latter being liquid.

5. The process according to claim 1, wherein the Lewis acid is a boronhalide.

6. The process according to claim 1, wherein the at least one monomer is 1,3,5-trioxane.

7. The process according to claim 1, wherein the at least one comonomer is 1,3-doxolane or 1,3-dioxepane or a mixture thereof.

8. The process according to claim 1, wherein at least one chain transfer agent is present.

9. The process according to claim 8, wherein the chain transfer agent is methylal or butylal.

* * * * *